D. Philips,
Saw Teeth.
N° 2,001.  Patented Mar. 12, 1841.
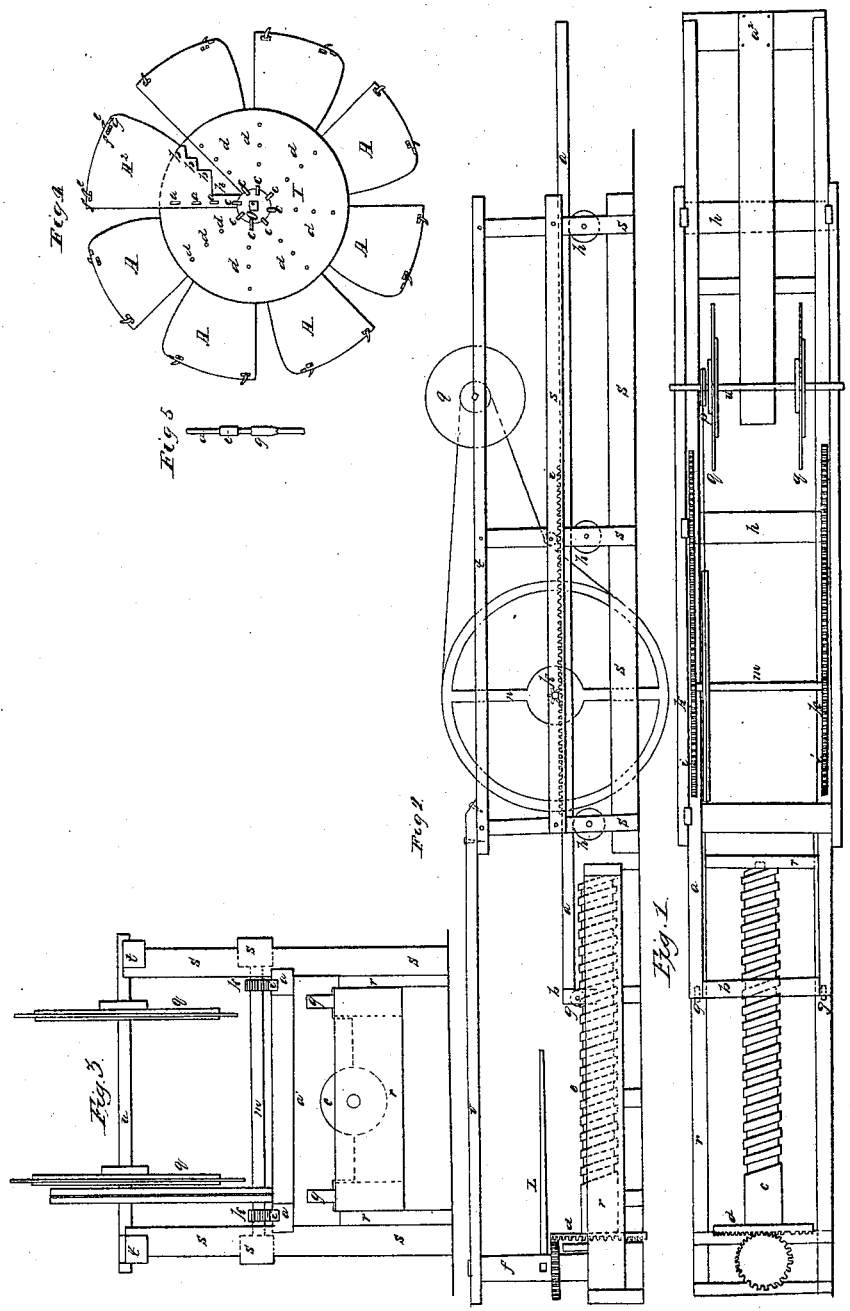

UNITED STATES PATENT OFFICE.

DAVID PHILIPS, OF GEORGETOWN, PENNSYLVANIA.

SAWMILL.

Specification of Letters Patent No. 2,001, dated March 12, 1841.

*To all whom it may concern:*

Be it known that I, DAVID PHILIPS, of Georgetown, in the county of Mercer, State of Pennsylvania, have invented a new and useful Improvement in the Construction and Propelling of a Circular Saw, which is described as follows, reference being had to the annexed drawings of the same, making a part of this specification.

Figure 1, plan; Fig. 2, side elevation; Fig. 3, end elevation; Fig. 4, circular saw; Fig. 5, guide.

The saw A is constructed in such a manner that it can be increased to any dimension desired with but little expense. The teeth $e$ are put on in such a manner, that they can be easily taken off to sharpen, or for any other purpose. The saw is constructed by attaching plates A of steel which I denominate arms to a flanch I, see Fig. 4, which flanch may be made of cast iron or hard wood, but I prefer the former. It must be about two feet in diameter for a saw intended to cut flooring, or stuff of less width and enlarged in proportion to the increased dimension of saw. The thickness of the stuff to be sawed must govern the length of the arms A or their projection beyond the flanch I, which will be about ten inches for flooring. The flanch must be about a half inch thick with a hub O, Fig. 4, about four inches long with a square opening to receive the shaft, the dimensions of which will be governed by the size of the shaft to be described hereafter. One side of the flanch is formed to receive the arms, by being indented the thickness of the arms and shaped to fit them, see $A^2$, Fig. 4. This may be done in the casting by forming a pattern to make the indentations, or they may be cut with a chisel. There must be about half an inch left between each indentation to support the edges of the arms at the narrowest point, see $h$, Fig. 4. There must be two or more holes in each place where indented for bolts to pass through, see $d$, Fig. 4, and also a square hole at or nigh the hub about two inches long and a half inch wide for a key to regulate the arms, see $c$, Fig. 4. There may be any number of arms attached to a flanch that may be found necessary to suit it to perform the object desired. To be worked by manual labor about four will be sufficient with one tooth in each. But when driven by horse or other modes of propelling machinery more will be found necessary, say from eight to sixteen, with two teeth in some cases in each arm put on from opposite sides and the width of the arms will be governed by the number attached both as it relates to the parts inside or outside of the flanch. The arms A are formed by making square offsets and shoulders for the purpose of allowing them to be moved out or in without becoming loose at the edges and of giving to them the greatest possible width at the edge of the flanch, see Fig. 4, $A^2$. There must be a notch cut in the center of the inner point of the arm about a fourth of an inch deep and long enough to allow the key before alluded to to fit in it, see $c$, Fig. 4. There may be three or more shoulders made in the front edge of the arm. The first square may be about two inches wide at the point where the notch is cut for the key and three inches long. There may be an offset or shoulder on both edges giving all the width to the arm that it can assume without weakening the support at the edges before alluded to. It may be three inches between each of the shoulders, let them be more or less, and there should be but one on the back edge but as many in the front as the distance from the point to the edge of the flanch will admit. The back edge of the arm must be straight to allow this to be done in this manner. But the front edge is curved, see Fig. 4, to make them enter the kerf gradually. By entering first at the flanch will have a tendency to steady the arm and brace the teeth. There must also be oblong square holes cut in the arms at such points as will correspond with those before described in the flanch for the bolts to pass through, see $a$, Fig. 4. Said holes must be about two inches long and sufficiently wide for the bolts to pass through. They are made oblong for the purpose of sliding on the bolts when regulated by the key. There must also be holes $f$ cut in the arms to receive the lower end of the teeth $e$, see $f$, Fig. 4. Said holes must be about an inch and a half long and about a fourth of an inch wide leaving a space between them and the outer edge of the arms of about a half inch at the front and about five eighths at the back end, see Fig. 4. Both the outer and inner edges must be beveled from the same side by cutting the edges to an angle of about forty five degrees, thereby forming part of a dovetail to fit into corresponding notches cut in the teeth as will be shown hereafter. The teeth may be of any length or width and made to suit circumstances, and regulated in their dimension and strength by the force to be applied to them; for common purposes they may be about an inch wide where connected with the arms and they may extend an inch beyond them and curve forward so that the point will be about a fourth of an inch beyond the body of the teeth, see Fig. 4. There must be a notch cut in the side of each tooth about three fourths through it, leaving about a fourth of an inch to the lower end which passes into the hole before described in the arm. The notch must be sufficiently wide to allow it to pass on the narrow end of the space with the back part of the notch some wider than the front to correspond with the space before alluded to and a dovetail cut in each jaw by a three squared file and made to fit the bevel before described on the edges of the spaces, so that when the tooth is put on by passing the narrow end of the space into the tooth it can be driven back till it becomes tight; and by riveting a sufficient quantity of lead or other malleable metal in the space in front of the tooth to fill it; this will keep them back to their place and they will remain tight and by punching it out they can be taken off by driving them forward. This can be done in a few moments and only requires the holes in the arms to be cut regularly and the teeth to be made to a pattern to be replaced in a few moments when they break or need sharpening.

There may be a little cut off the sides of the spaces to make the teeth range with the arms when they are found to be too much on one side. The back of the teeth should be left square with the edge to brace against the wood for at least an eighth of an inch to prevent it from straining into the wood as it will be inclined to do if the edge points out with nothing to brace it. The teeth must be made of the best material and temper for edge tools. There must be a piece of steel which I denominate a guide inserted in the edge of each arm about an inch in front of the teeth, see g, Fig. 4. It may be about a half inch long and about an eighth thicker than the arm at the back end but the same thickness of the arms at the front end. It is let in by cutting a notch in the edge of the arm a fourth of an inch deep and by mitering the jaws or shoulders of the notches—and notches cut in the ends of the guide by a three square file. It can be driven in, the miter on the shoulders fitting into the ends of the guide. If well executed it will remain permanent and will guide the teeth to the proper position on first entering and keep them from varying while cutting and also prevent any friction of the arms by keeping them in the center of the kerf. The teeth must be broadest at the point and sufficiently wide to clear the channel for all to pass without producing too much friction.

The arms may be of any thickness used for common saws. Their thickness will be determined by the power to be applied and the thickness or hard or soft quality of the timber to be sawed. The shaft may be of cast or wrought iron and for a heavy saw it should be at least three inches diameter and about four feet long and it must be well secured by plumber blocks and bolts let into solid timbers especially when the force applied is to be great. It is very important that the saw should be made to revolve with the greatest precision as a very little deviation will be attended with a bad effect, whether a vertical or lateral variation from a true line it will be attended with bad consequences. To prevent a lateral variation there may be shoulders to each end of the journals, or a ring in the center; or there may be temper screws applied to the ends of the shaft. Any vertical variation can be overcome by the keys. It has been the difficulty in making the saw revolve true which has so long kept the hooked teeth out of general use. Together with that of keeping them in good order and as any irregularity in the advance of the carriage would be attended with the same bad consequences I have adapted the screw both to move the carriage and propel the saw at the same time, thus giving a solid and regular motion all at the same time. From the solid manner of constructing the saw by means of the flanch and arms before described together with a plate which I will now describe will render it exceedingly firm. Said plate may be of cast iron a fourth of an inch thick and of the same dimension of the flanch, with an opening in the center to fit the hub with holes corresponding with those in the flanch for the bolts to pass through. Thus when the bolts are made to fit the holes both in this and the flanch with good screw taps they can be made to clamp the arms so hard that they cannot move and they will remain permanent when set to their proper place; or by slacking the screws they can be moved out or in as the nature of the case may require, and by applying two saws on the same shaft with the teeth set in opposite directions at a suitable distance apart for the log to be moved from one to the other alternately saves the loss of time to run the carriage back and can be effected by reversing the movement of the screw.

The mode of constructing the propelling apparatus is as follows, viz.—make a frame S about twenty-five feet long and about four feet wide in the clear with a ground sill and plate and three posts on each side, see drawings S S, &c. The posts may be about five feet high and six by ten inches, the ground sill twelve by twelve inches and the plates six by ten and the same length of the sills. The latter may be dispensed with by setting the posts in the ground. The posts are stationed one at each end and one in the middle of each side, see Fig. 2, to which there are three rollers $h$ attached one at each end and one in the middle as low as possible, see Fig. 1. Said rollers are about a foot in diameter with journals of wood or iron at each end, which rest on the ground sills or they may be let into the posts. The carriage $a$ rests on them together with the timbers which connects it with the screw $c$; which I denominate connecting timbers, and to which the racks $i\ i$ are attached, see drawings.

The carriage proper is that part on which the log rests see $a^2$. These timbers may all be about six inches square and about four feet four inches from outside to outside when framed together. The outer end of the carriage may be connected together by a cross piece $a^2$, eighteen inches by six with double tenons let into the side pieces of the carriage close to the end, see $a^7$ Fig. 1. There must be a gain cut out of the posts two inches deep and six inches wide and must extend a little below the top of the rollers to allow the carriage to clear it so that the whole weight will rest on the rollers and sufficiently far above them to allow the outside edge of the carriage to enter them when the upper shoulder will keep them down on the rollers. There is a timber in the center of the carriage for the log to rest on, see $a^2$, Fig. 1. The connecting timbers are to be attached to the female at one end and to the carriage at the other making a part of the carriage. To each of these timbers there is a toothed rack $i$ (or cogs of wood) attached or inserted about the middle which teeth or cogs may be about four inches broad and two inches pitch. The rack must be as long as the movement given by the screw. There must be a timber on each side of the frame six by ten attached to the outside of the posts to sustain the shaft on which the pinions and whirl are attached, see drawings. There must be a pinion $k$ on each end about four inches diameter with the same width and pitch of the racks. The shaft may be four inches diameter with the teeth cast with it and the journals one at each end may be three inches diameter. I prefer this mode to having the pinions separate. The shaft is confined to the timbers before alluded to by strong plumber blocks and bolts and must be set about four or five feet from the first roller to allow the wheel $n$ to run clear of the roller. Said wheel must be about nine feet in diameter. It must be fastened on the shaft as nigh one side of the frame as it will answer to run clear of the frame and carriage timber. It may be made of cast iron or wood with a mitered groove in the middle of the face for a common chain or rope to pass around it and around a whirl on the saw shaft (to be described hereafter), or it may have teeth inserted in the face to pass into open links made to suit it with similar teeth in the whirl, the saws $q$ are placed about six feet from the back end of the frame, see Figs. 1 and 2, with two saws on the same shaft with the teeth of one set in opposite direction to the other, as heretofore alluded to. There must be a whirl $p$ attached to the saw shaft at a proper point to receive the rope or chain from the wheel before described and must have a groove or teeth in the edge or face to correspond with that in the face of the wheel. There must be a roller attached to the side of the frame and about midway between the saws and wheel, see Fig. 2, to raise the chain and make it lap around the wheels also for the purpose of regulating the pressure of the chain so that it can be made tighter or slacker at pleasure. This can be done by making a frame for the whirl to slide in a rabbet and attaching a lever with weight attached to it or it may be done in any other manner that fancy may suggest.

The screw $c$ is placed horizontal and with its center parallel with the carriage and supported at the top by a cross timber attached to the ground sills of the frame, see $c$, Fig. 2, and at the butt end by a block eighteen inches square laid on the ground. On each side of the screw there is a timber $x$ six by ten inches and sufficiently long to connect the timbers which support the screw to which they are firmly fastened. The screw may be made any length desired but for common purposes it must be from twelve to sixteen feet, and about one foot in diameter with square threads cut about an inch deep with six inches draft, see $c$, Figs. 1 and 2, with a strong step gudgeon inserted in each end to work in steps or boxes let into the timbers on which the screw rests before described. There must be holes inserted in the steps or boxes to receive the points of the gudgeons said holes must be two inches deep if the weight of the screw is made to rest on the points of the gudgeon or they may not be over a half inch deep if the weight is sustained on the side of the gudgeon. The latter mode can be adopted by making journals about four inches long. There is a female attached to the connecting timbers of the carriage, see $b$, Figs 1 and 2. It must be about two feet broad and one foot thick if made of wood with a concave opening in the middle of the lower edge and half the diameter of the screw in depth, see $p$, Figs. 1 and 2. There must be threads made in this opening to correspond with the screw or there may be a female cast concave as above described with arms arranged so that it can be securely attached to the carriage and journals connected with the ends of the arms to receive rollers. They can also be attached to the female if made of wood by inserting gudgeons of iron. In either case the rollers must be supported by the timbers on each side of the screw and must traverse on a line with carriage.

The screw may be propelled by manual labor or horse or other powers. But I deem horse power as the best adapted to it. It can be arranged for this by attaching a wheel $d$ to the butt end of the screw about three feet diameter with cogs on the outer face, see $d$, to gear into a pinion $e$ on an upright shaft $f$, see $e$, $f$, Fig. 2, which shaft must be about eighteen inches diameter and of sufficient height to allow a horse to pass under the timber which supports it on the top, see Fig. 2. There must be a mortise through the shaft just above the pinion for a lever L. The pinion may be two feet in diameter and the lever about ten feet long. The whole may be sunk below the surface of the ground about two feet and a bridge thrown across the screw at a proper point for the horse to pass over. This will be the most convenient mode or manner of arranging it; or there may be a circular bridge made for the horse or men to walk on. The shaft must run on a step gudgeon, at the lower end, fit into an ink let into a timber connected with the screw. The one at the upper end may have a common journal. The shaft is held to its place at the top by a timber connected with the top of the main frame and by another timber twenty feet long placed at right angles to that with the center resting over the gudgeon and the ends on posts let into the ground.

The whole arrangement is such that when the screw is turned the carriage is moved on with the log toward the saws. The rack being attached to the carriage turns the wheel and it causes the saws to revolve by means of the chain rope or belt passed around it and the wheel on the saw shaft, see Fig. 2. The relative size of the wheel pinions and whirl determines the number of revolutions that the saws will perform, to any given advance of the carriage. Thus to give the wheel nine feet diameter, and pinions four, inches, and the whirl six inches, diameter, the saws will revolve about nineteen times to each foot the carriage advances. This will be found amply sufficient as the teeth may be made to cut a sixteenth of an inch in green or soft timber and it can be made to cut back and forward by reversing the motion of the screw either by turning the horse the other way or by the gearing, by shifting the wheels. The well known power of the screw is such that the necessary power can be given from comparatively small force applied to propel it, and in connection with this advantage is that of the firm and regular advance of the carriage which is of the greatest importance, and which cannot be given so well by any other mode of gearing and these considerations together with the peculiar structure of the saw whereby it is susceptible of sustaining great force being applied to it and from its cutting in place of scraping it does not require velocity to the same extent of the common saw.

I do not claim as of my invention the mere attachment of a series of plates to a flanch for the purpose of making a circular saw, nor making the teeth separate from the plates, as these have been done before, but not as I verily believe in the manner specified by me, and Therefore what I claim as my invention and desire to secure by Letters Patent is—

1. The method of attaching the plates or arms to the main flanch by letting them into recesses, of the form above described, in the flanch and having a second flanch or plate riveted or bolted to the main flanch embracing the plates or arms, the plates or arms being provided with long slots through which the rivets or bolts pass, and a key passing through the flanch and plate and through a notch in the end of the arms for the purpose of regulating the sweep of the teeth in their revolution as herein described.

2. I also claim the guide attached to each plate or arm in front of each tooth for the purpose and manner described.

3. Also the method of fastening the teeth to the arms by means of the dovetailed wedge lap as above described.

4. And finally I claim the method of giving motion to the saw or saws by means of the combination of the screw, the rack or racks, attached to the carriage and the pinion or pinions attached to the saw shaft, so that the motion of the carriage, received from the screw, shall give motion to the saw or saws as herein described.

DAVID PHILIPS.

Witnesses:
 E. MAHER,
 THOS H. DE WITT.